United States Patent
Munk et al.

(10) Patent No.: US 6,682,107 B2
(45) Date of Patent: Jan. 27, 2004

(54) PRELOADED SQUNCH CONNECTOR

(75) Inventors: Brian N. Munk, Houston, TX (US); Joseph W. Pallini, Jr., Tomball, TX (US); Rockford Dee Lyle, Pinehurst, TX (US)

(73) Assignee: ABB Vetco Gray Inc., Houston, TX (US)

( * ) Notice: Subject to any disclaimer, the term of this patent is extended or adjusted under 35 U.S.C. 154(b) by 0 days.

(21) Appl. No.: 10/116,224

(22) Filed: Apr. 4, 2002

(65) Prior Publication Data

US 2002/0163190 A1 Nov. 7, 2002

Related U.S. Application Data

(60) Provisional application No. 60/281,832, filed on Apr. 5, 2001.

(51) Int. Cl.[7] ............................................... F16L 37/00
(52) U.S. Cl. .................. 285/309; 285/307; 285/321; 285/403; 285/29; 285/428
(58) Field of Search ................................. 285/307, 305, 285/308, 309, 321, 403, 404, 81, 90, 123.4, 123.14, 123.13; 29/428, 455.1, 464, 525.01, 525.13

(56) References Cited

U.S. PATENT DOCUMENTS

| | | | | |
|---|---|---|---|---|
| 3,345,087 A | * | 10/1967 | Hanes et al. | 285/321 |
| 3,455,578 A | * | 7/1969 | Hanes | 285/321 |
| 3,585,803 A | * | 6/1971 | Bardgette | 285/321 |
| 4,114,928 A | * | 9/1978 | Lochte | 285/309 |
| 4,209,193 A | | 6/1980 | Ahlstone | |
| 4,603,886 A | * | 8/1986 | Pallini et al. | 285/321 |
| 4,610,465 A | * | 9/1986 | Boyadjieff | 285/308 |
| 4,611,829 A | * | 9/1986 | Hughes | 285/321 |
| 4,954,004 A | * | 9/1990 | Faber et al. | 285/321 |
| 5,002,129 A | * | 3/1991 | Hopper | 285/308 |
| 5,026,200 A | * | 6/1991 | van Bilderbeek | 285/321 |
| 5,209,521 A | * | 5/1993 | Osborne | 285/123.4 |
| 5,333,911 A | * | 8/1994 | Watkins | 285/309 |

FOREIGN PATENT DOCUMENTS

| | | |
|---|---|---|
| EP | 0124468 A1 | 11/1984 |
| GB | 1487948 | 10/1977 |
| GB | 2099945 A | 12/1982 |
| GB | 2304846 A | 3/1997 |
| JP | 587277 * | 4/1993 ..... 285/404 |

OTHER PUBLICATIONS

ABB Vetco Gray An ABB Oil & Gas Company *Connector and Tubular Products*, "Conductor Connectors" p. 9.

* cited by examiner

*Primary Examiner*—David Bochna
(74) *Attorney, Agent, or Firm*—Bracewell & Patterson, L.L.P.

(57) ABSTRACT

A connector for connecting two tubular members has a pin and a box, the box having a bore that receives the pin in stabbing engagement. The bore having a grooved profile, and a split lock ring mounted to the pin, the lock ring snapping into engagement with the grooved profile in the box when the box and pin are stabbed together to lock the tubular members together. An annular wedge shoulder is located on the pin axially spaced apart and facing a rim on the box. The wedge shoulder and rim are inclined relative to each other, resulting in a closer axial distance between them at outer diameters of the pin and box than farther inward. An annular recess is located on the pin at an inner portion of the wedge shoulder, the recess having an inner wall facing outwardly. A split wedge ring is located between the wedge shoulder and the rim, the wedge ring being outwardly moveable from a retracted position in the recess to a wedging position in engagement with the wedge shoulder and the rim to wedge the wedge shoulder and the rim apart from each other. A threaded member engages a threaded hole in the wedge ring and has an inner end that abuts the pin in the recess to push the wedge ring radially outward to the wedging position when the threaded member is rotated.

20 Claims, 4 Drawing Sheets

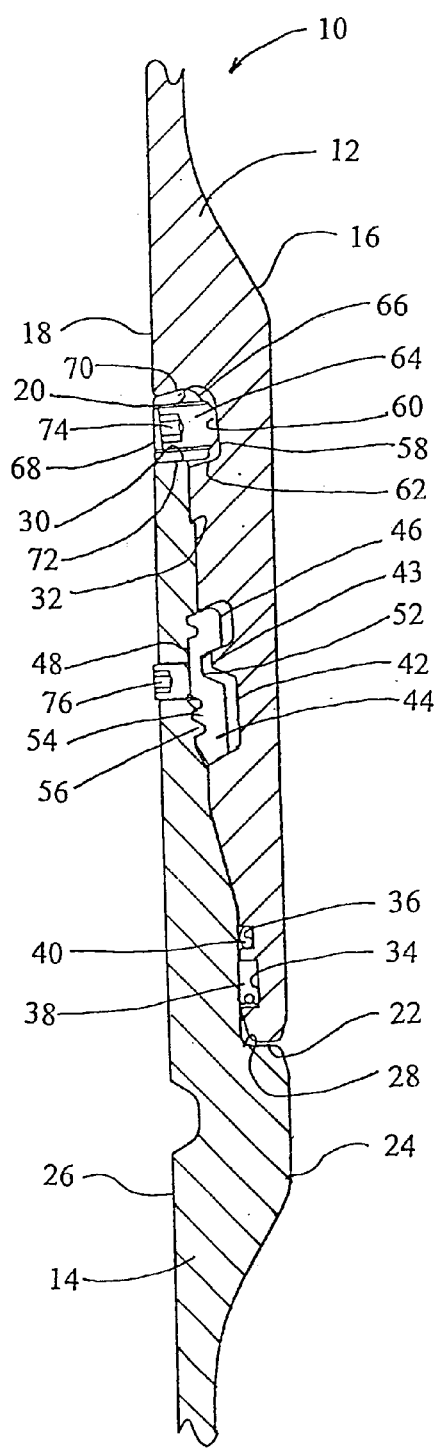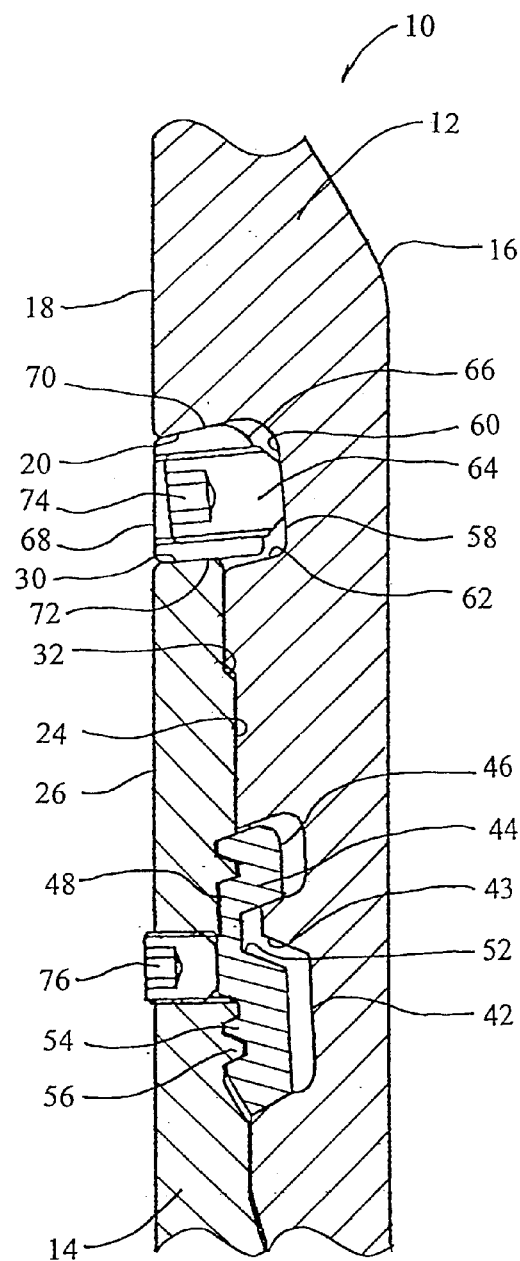
FIG. 1
FIG. 2

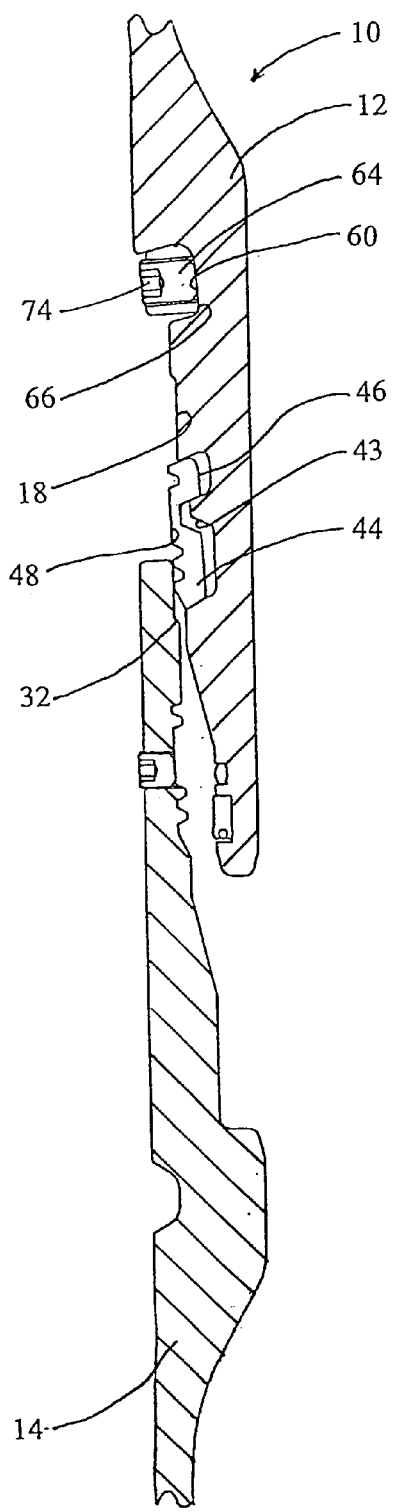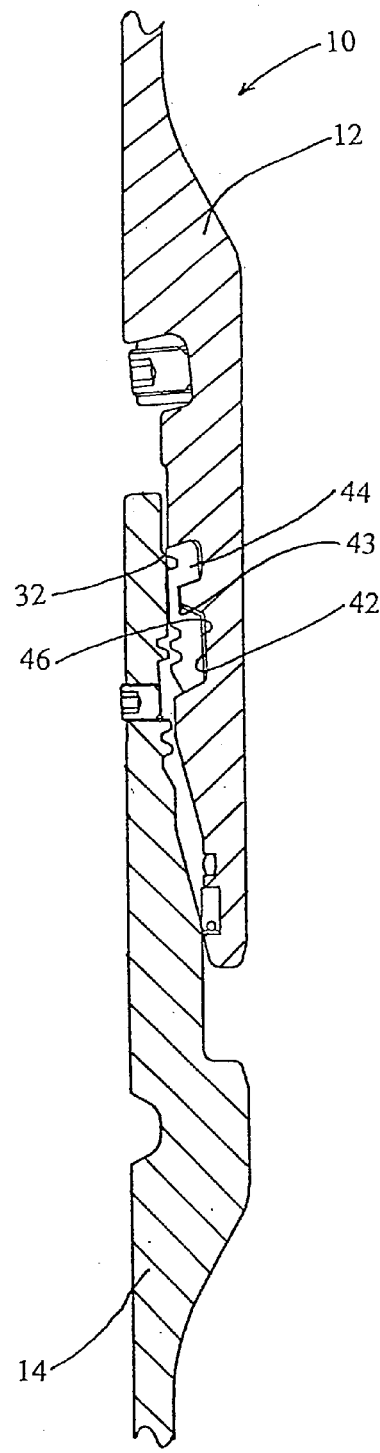
FIG. 3
FIG. 4

PRELOADED SQUNCH CONNECTOR

This application claims the filing date of provisional application Ser. No. 60/281,832, filed Apr. 5, 2001.

TECHNICAL FIELD OF THE INVENTION

This invention relates in general to a connector for a tubular joint, and in particular to a connector used for air cans in subsea drilling applications.

BACKGROUND OF THE INVENTION

One type of connector for two tubular members has a box on one of the tubular members and a pin on the other. The pin stabs straight into engagement with the box. A split lock ring on the pin snaps into engagement with a groove in the box, locking the members together. The pin and box can be released from each other by causing the lock ring to contract. This is handled by rotating screws that have heads on the exterior of the box. The screws have inner ends that contact and push the lock ring inward as they are rotated. This type of connector is sometimes called a "squnch" joint connector.

This type of connector is quick to make up and doesn't require rotation of the tubular members since it doesn't have threads. However, it does result in some axial slack. Because the lock ring has to clear the groove before it can enter, some slack or play results in the connection. This presents a problem in applications, such as subsea tubular members that are subject to wave and current movement. In these applications, the tubulars are subject to load cycles between tension and compression due to the cyclic bending. This is particularly of concern where metal-to-metal seals between the pin and box are required.

SUMMARY OF THE INVENTION

The connector of this invention has a pin adapted to be connected to one of the tubular members and having an external annular engagement surface. A box is adapted to be connected to the other of the tubular members, the box having an internal annular engagement surface that receives the pin engagement surface in stabbing engagement. A split lock ring is mounted to one of the engagement surfaces for engaging a grooved profile in the other of the engagement surfaces to lock the tubular members together as the pin and box are stabbed together.

A wedge shoulder is located on the pin. A wedge member is radially moveable after the lock ring has engaged the profile to a wedging position wedged between the wedge shoulder and a reacting surface of the box. This causes slack to be removed between the lock ring and the grooved profile.

BRIEF DESCRIPTION OF THE DRAWINGS

FIG. 1 is a sectional view of the connector of the invention, shown fully made up with the lock ring uncompressed and the wedge ring in the preloaded position.

FIG. 2 is an enlarged view of the connector of FIG. 1, showing the lock ring and the wedge ring in greater detail.

FIG. 3 is a sectional view of the connector of FIG. 1, shown prior to installation, with the lock ring uncompressed and the wedge ring in the retracted position.

FIG. 4 is a sectional view of the connector of FIG. 1, shown during installation, with the lock ring compressed and the wedge ring in the retracted position.

DETAILED DESCRIPTION OF THE INVENTION

Figure 5:
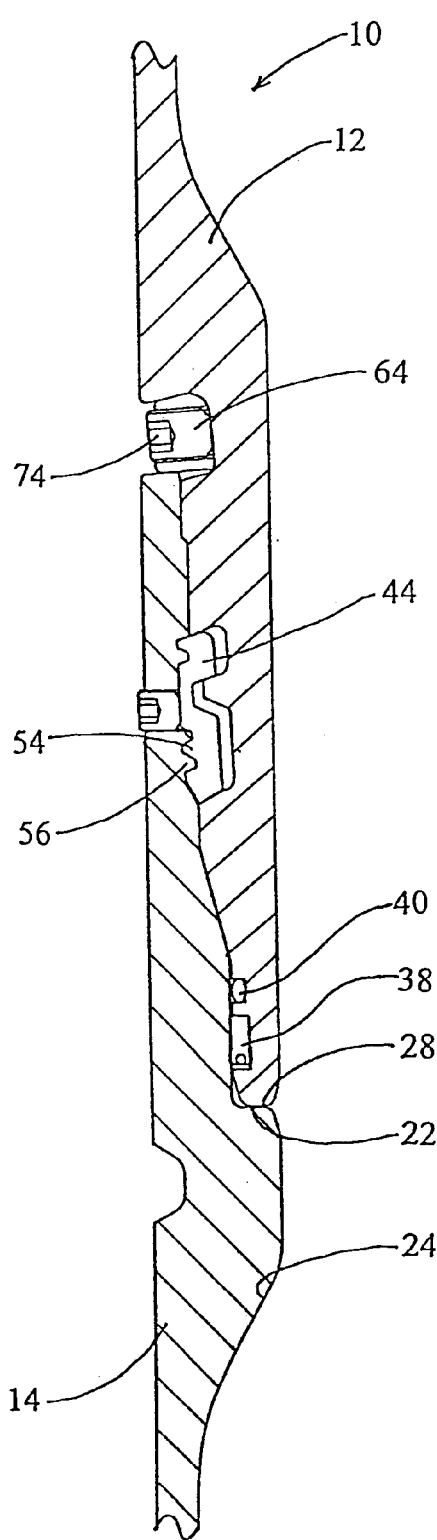
FIG. 5 is a sectional view of the connector of FIG. 1, shown during installation, with the lock ring uncompressed and the wedge ring in the retracted position.

FIGS. 1, 2, & 3 illustrate a connector 10, constructed in accordance with this invention. Connector 10 generally comprises a pin member 12 that stabs into a box member 14. Pin member 12 has a pin member inner bore 16 and a pin member outer engagement surface 18. Pin member inner bore 16 is concentric to a longitudinal axis of the connector 10. Pin member outer surface 18 generally tapers from a downward facing pin shoulder 20 to a pin nose 22. Pin shoulder 20 is slightly conical, being at a taper angle of about 15 degrees relative to a plane perpendicular to the longitudinal axis. The intersection of pin shoulder 20 with pin member outer surface 18 is closer to pin nose 22 than the inner periphery of pin shoulder 20.

Box member 14 has a box member engagement surface or bore 24 and a box member outer surface 26. Box member bore 24 generally tapers from an internal box shoulder 28 to box rim 30, to mate with pin member outer surface 18. Box member outer surface 26 is concentric with the longitudinal axis of the connector 10. Box member bore 24 may have an upward-facing tapered stop 32 located near box rim 30.

Pin member outer surface 18 has two circumferential seal grooves 34, 36 located near pin nose 22. Primary seal groove 34, located closer to pin nose 22, carries an elastomeric seal ring 38. Backup seal groove 36, located farther from pin nose 22, carries an elastomeric O-ring seal 40. Seal ring 38 and O-ring 40 sealingly engage box member bore 24 to create a primary seal and a backup seal a selected distance away from box shoulder 28. Although the preferred embodiment of the invention discloses seal elements, seals 38, 40 are optional, and may be positioned at various locations in the connector 10. Furthermore, it will be understood by those skilled in the art that the sealing capabilities of the connector are not crucial to the invention, and the seal elements may be omitted without departing from the scope of the invention. Also, metal-to-metal seals could be used rather than elastomeric seals.

Pin member outer surface 18 also has a circumferential lock ring groove 42 located approximately midway between pin shoulder 20 and pin nose 22. Lock ring groove 42 has a lock ring rib 43 between its upper and lower ends. Both the upper and lower ends of groove 42 are frusto-conical with the outer periphery being closer to pin nose 22 than the inner periphery. Lock ring groove 42 carries a split lock ring 44. In this embodiment, lock ring 44 is generally rectangular in cross-section, with a lock ring inner surface 46 and a lock ring outer surface 48. The distance between lock ring inner surface 46 and lock ring outer surface 48 defines the radial thickness of lock ring 44. Lock ring groove 42 has a radial depth greater than or equal to the radial thickness of lock ring 44. Lock ring 44 has a plurality of grooves forming teeth 54 on its outer surface 48. A recess 52 on lock ring inner surface 46 accommodates lock ring rib 43.

Lock ring rib 43 cooperates with circumferential groove 52 located on lock ring inner surface 46 to prevent axial movement of lock ring 44 within lock ring groove 42. Box member bore 24 has box member teeth 56. When the connector 10 is fully made up, lock ring teeth 54 engage box member teeth 56 to prevent axial movement of box member 14 relative to pin member 12. Other configurations for lock ring 44 may be utilized.

Lock ring 44 is a split, C-shaped ring that can contract from a natural position to a fully contracted position. When lock ring 44 is in its natural position, the inner diameter of lock ring 44 is greater than the inner diameter of pin member 12, such that lock ring 44 protrudes radially outward from pin member outer surface 18. Because lock ring groove 42 has a radial depth greater than or equal to the radial thickness of lock ring 44, lock ring inner surface 46 is spaced a selected distance away from lock ring rib 43 in the natural position. When lock ring 44 is fully contracted, as illustrated in FIG. 4, the inner diameter of lock ring 44 is equal to, or only slightly greater than, the inner diameter of pin member 12. In the fully contracted position, lock ring inner surface 46 is immediately adjacent to lock ring rib 43.

Pin member outer surface 18 has a circumferential wedge ring groove 58 located immediately adjacent to pin shoulder 20. Wedge ring groove 58 has a wedge ring groove inner surface 60 and a wedge ring groove lower surface 62. Pin shoulder 20 comprises the upper surface of wedge ring groove 58. Wedge ring groove 58 carries a wedge ring 64. Wedge ring 64 is approximately rectangular in cross-section, having a wedge ring inner surface 66, a wedge ring outer surface 68, a wedge ring upper surface 70, and a wedge ring lower surface 72. Wedge ring lower surface 72 is approximately perpendicular to the longitudinal axis of connector 10 in the first embodiment. Wedge ring upper surface 70 is at a selected angle relative to wedge ring lower surface 72, such that wedge ring inner surface 66 has a greater axial extent than wedge ring outer surface 68. When connector 10 is fully made up, wedge ring 64 is located between box rim 30 and pin shoulder 20. Wedge ring 64 has a selected radial thickness that is less than the radial dimension of wedge ring groove 58.

Wedge ring 64 is a split C-ring that can expand from a preloaded position to a retracted position. Preferably, wedge ring 64 is inwardly biased, so that it tends to move to the retracted position. In the preloaded position, as shown in FIGS. 1 & 2, wedge ring outer surface 68 is approximately flush with pin member outer surface 18 and box member outer surface 26. In the retracted position, illustrated in FIG. 3, wedge ring inner surface 66 physically contacts wedge ring groove inner surface 60. Wedge ring 64 also has a set of actuation or wedge screws 74 evenly spaced around the circumference of the connector 10. As explained below, actuation screws 74 allow wedge ring 64 to be moved between the preloaded position and the retracted position.

Box member 14 has a set of lock ring release screws 76. Lock ring release screws 76 are located axially between box member teeth 56, evenly spaced around the circumference of connector 10. As can be seen in FIGS. 1 & 2, lock ring release screws 76 will be located at the same axial position as lock ring 44 when connector 10 is fully made up.

In operation, connector 10 will be installed as illustrated in FIG. 3. Before pin member 12 stabs into box member 14, lock ring 44 is in its natural state and protrudes radially outward from pin member outer surface 18. Lock ring inner surface 46 is spaced a selected distance away from lock ring rib 43. Wedge ring 64 is in the retracted position, with wedge ring inner surface 66 in physical contact with wedge ring groove inner surface 60. As pin member 12 stabs into box member 14, contact between tapered stop 32 and lock ring outer surface 48 forces lock ring 44 to move to the contracted position. As shown in FIG. 4, lock ring 44 will remain in the contracted position with lock ring inner surface 46 located immediately adjacent to lock ring rib 43 as pin member 12 continues to stab into box member 14.

Although the preferred embodiment of the invention includes a tapered stop 32, it will be clear to those skilled in the art that other configurations are possible without departing from the scope of the invention. For example, the connector can be configured to land out in the wedge ring or elsewhere if desirable.

As shown in FIG. 5, when pin nose 22 reaches box shoulder 28, lock ring 44 will be positioned so that lock ring teeth 54 are aligned with box member teeth 56. Lock ring 44 will expand from the contracted position to the uncontracted position and lock ring teeth 54 will fully engage box member teeth 56, preventing axial movement between box member 14 and pin member 12. Seal ring 38 and O-ring 40 will be in sealing contact with box member inner surface 24.

Once pin member 12 is fully stabbed into box member 14, actuation screws 74 are manually rotated. Rotation of actuation screws 74 bears against pin recess surface 60 and causes wedge ring 64 to move from the retracted position to the preloaded position illustrated in FIG. 1. As wedge ring 64 moves outward toward the preloaded position, the engagement of wedge ring 64 with the negative draft angle of pin shoulder 20 and the reaction surface or rim 30 creates a tensile axial force tending to separate pin member 12 and box member 14. This tensile axial force first removes any axial slack between lock ring teeth 54 and box member teeth 56, then generates a preload within connector 10. When wedge ring outer surface 68 is flush with pin member outer surface 18 and box member outer surface 26, connector 10 is fully made up and preloaded.

Figure 6:
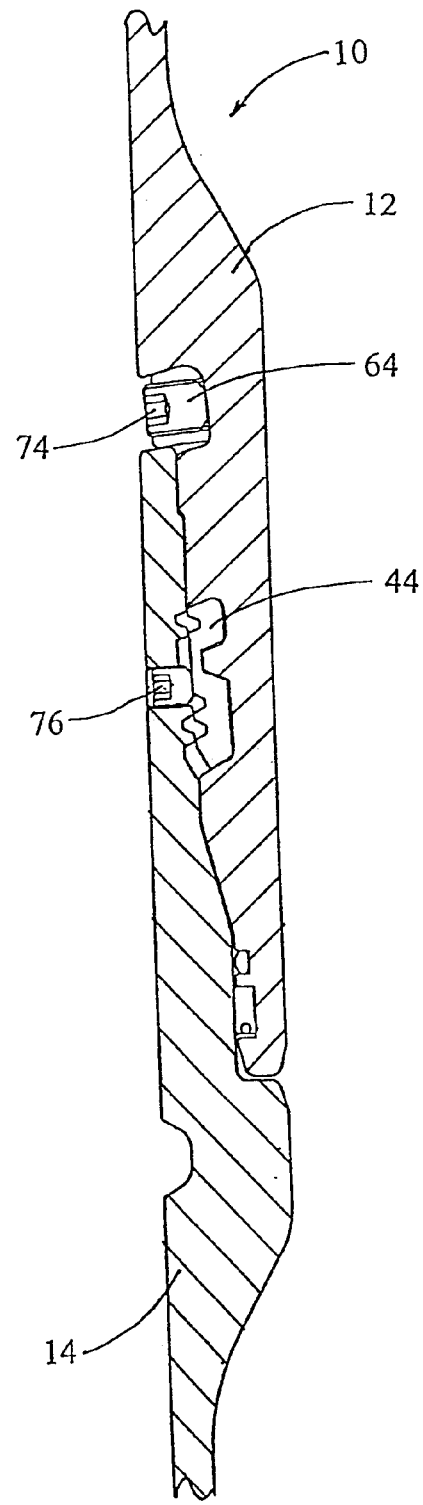
FIG. 6 is a sectional view of the connector of FIG. 1, shown immediately prior to release, with the lock ring compressed and the lock ring release screws actuated.

To release connector 10, actuation screws 74 are rotated to move wedge ring 64 from the preloaded position to the retracted position. Next, lock ring release screws 76 are rotated, causing lock ring 44 to move from the uncontracted position to the contracted position as illustrated in FIG. 6. Once lock ring 44 is in the contracted position, pin member 12 and box member 14 may be pulled apart.

Figure 7:
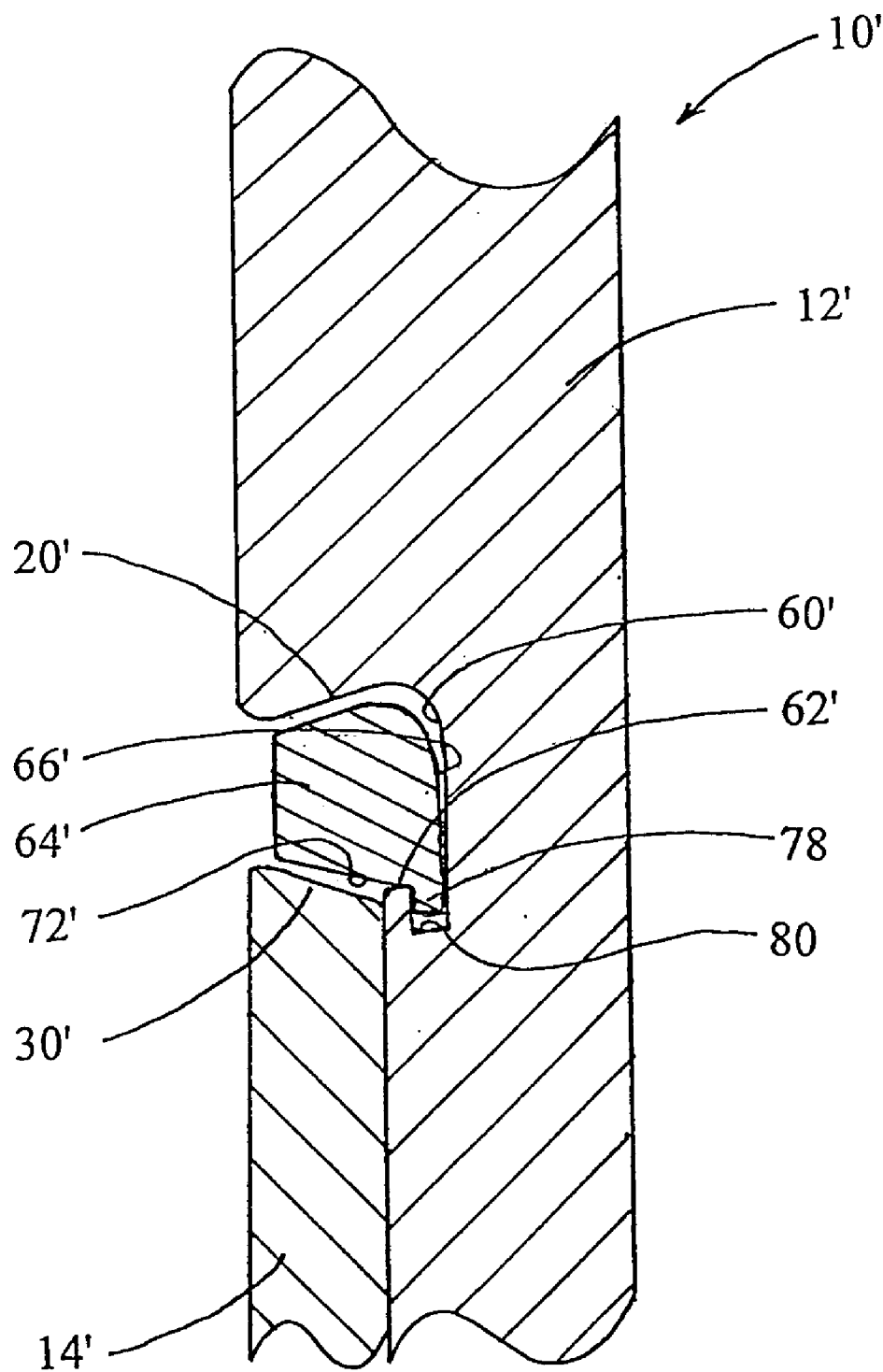
FIG. 7 is an enlarged sectional view of an alternate embodiment of the wedge ring of the invention, shown in the retracted position.

FIG. 7 illustrates an alternate embodiment of the invention. In this alternate embodiment, wedge ring 64' has a lower surface 72 that has a lip 78 extending axially away from pin shoulder 20'. Lip 78 engages a retainer groove 80 in wedge ring groove lower surface 62', holding wedge ring 64' in the retracted position, with wedge ring inner surface 66' immediately adjacent to wedge ring groove inner surface 60'. As pin member 12' stabs into box member 14', box rim 30' will contact wedge ring lower surface 72. This contact will cause wedge ring 64' to move upward into direct contact with pin shoulder 20'. When wedge ring 64' moves into contact with pin shoulder 20', lip 78 will disengage from retainer groove 80. The resiliency of wedge ring 64' causes it to expand radially from the retracted position. Wedge ring 64' will move away from wedge ring groove inner surface 60' to the preloaded position. In the preloaded position, the resiliency of wedge ring 64' causes wedge ring 64' to initially move slightly farther outward as the tubular members initially bend cyclically, wedging wedge ring 64' between shoulder 20' between rim 30' to take up axial slack. In the embodiment of FIG. 7, both wedge shoulder 20' and rim 30' are shown as being inclined relative to a longitudinal axis of the connector.

The invention has significant advantages. The wedging member causes slack to be taken out between the lock ring and profile of the connector. The wedging member is readily moved to the wedging position and is accessible from the exterior of the box.

While the invention has been shown or described in only two of its forms, it should be apparent to those skilled in the art that it is not so limited, but is susceptible to various changes without departing from the scope of the invention. For example, the release movement to cause the lock ring to radially contract could be handled by the wedging screws. To do so, an upper portion of the lock ring extends upward to a point radially inward from the wedge ring. The wedge ring screws are threaded so that rotating them to release the wedge ring and allow it to contract radially inward. Simultaneously, the inner ends of the screws contact the upper portion of the lock ring and push it radially inward to the released position.

In another alternative, the wedge member comprises segments, rather than a ring. In a further alternative, the wedge member is reciprocally carried in a cavity in the box so that it can move outward to be fully recessed within the bore of the box to allow entry of the pin. A tapered wedging shoulder is formed on a portion of the pin that locates within the bore adjacent the wedge member. Once the pin lock ring has locked, the operator rotates wedge actuator screws to cause the wedge member to move radially inward and engage the wedging shoulder on the pin. This causes the pin to move axially relative to the box to preload the connection. The pin wedge shoulder could be oriented to provide either tension or compression preload.

We claim:

1. A connector for connecting two tubular members, comprising:
   a pin adapted to be connected to one of the tubular members and having an external annular engagement surface;
   a box adapted to be connected to the other of the tubular members and having an internal annular engagement surface that receives the pin engagement surface in stabbing engagement;
   a split lock ring mounted to one of the engagement surfaces for engaging a grooved profile in the other of the engagement surfaces to lock the tubular members together as the pin and box are stabbed together;
   a wedge shoulder on the pin;
   a reacting surface on the box and spaced axially from the wedge shoulder relative to an axis of the connector, the wedge shoulder and the reacting surface being at different angles relative to the axis, defining a wedge-shaped space between them when viewed in cross-section; and
   a wedge member in the wedge-shaped space, having one surface in sliding engagement with the wedge shoulder and another surface in sliding engagement with the reacting surface, the wedge member being radially moveable after the lock ring has engaged the profile to a wedging position wedged between the wedge shoulder and the reacting surface of the box.

2. The connector according to claim 1, wherein the reacting surface comprises a rim of the box.

3. The connector according to claim 1, further comprising a threaded member that is manually actuable from an exterior of the box to move the wedge member radially into the wedging position.

4. The connector according to claim 1, wherein:
   the wedge member comprises a split wedge ring carried by the pin, the split wedge ring extending less than a full circle and having two free ends.

5. The connector according to claim 1, further comprising:
   a threaded release member having an inner end that engages the lock ring to push the lock ring from a locked position to a released position when the threaded release member is rotated to allow the pin and box to be pulled apart from each other.

6. A connector for connecting two tubular members, comprising:
   a pin adapted to be connected to one of the tubular members and having an external annular engagement surface;
   a box adapted to be connected to the other of the tubular members and having an internal annular engagement surface that receives the pin engagement surface in stabbing engagement;
   a split lock ring mounted to one of the engagement surfaces for engaging a grooved profile in the other of the engagement surfaces to lock the tubular members together as the pin and box are stabbed together;
   a wedge shoulder on the pin;
   a wedge member that is radially moveable after the lock ring has engaged the profile to a wedging position wedged between the wedge shoulder and a reacting surface of the box; and wherein:
   the wedge shoulder is axially spaced from the annular engagement surface of the pin and faces a rim of the box when the box and pin are stabbed together, the rim comprising the reacting surface of the box, the wedge shoulder and the rim being inclined relative to each other such that an axial distance between the wedge shoulder and the rim is less at outer diameters of the pin and the box than radially inward along the wedge shoulder;
   the wedge member comprises a split wedge ring carried within a recess on the pin adjacent the wedge shoulder; the wedge ring having one surface at a mating inclination to the wedge shoulder and another surface at a mating inclination to the rim; and
   a threaded member that engages a radial threaded hole in the wedge ring, the threaded member have an inner end that abuts the recess in the pin and pushes the wedge ring radially outward into the wedging position when the threaded member is rotated.

7. A connector for connecting two tubular members, comprising:
   a pin adapted to be connected to one of the tubular members and having an external annular engagement surface;
   a box adapted to be connected to the other of the tubular members and having an internal annular engagement surface that receives the pin engagement surface in stabbing engagement;
   a split lock ring mounted to one of the engagement surfaces for engaging a grooved profile in the other of the engagement surfaces to lock the tubular members together as the pin and box are stabbed together;
   a wedge shoulder on the pin;
   a wedge member that is radially moveable after the lock ring has engaged the profile to a wedging position wedged between the wedge shoulder and a reacting surface of the box; and wherein:
   the wedge shoulder is axially spaced from the annular engagement surface of the pin and faces a rim of the box when the box and pin are stabbed together, the rim comprising the reacting surface of the box, the wedge shoulder and the rim being inclined relative to each other such that an axial distance between the wedge shoulder and the rim is less at outer diameters of the pin and the box than radially inward along the wedge shoulder; and the wedge member comprises a split wedge ring carried within a recess on the pin adjacent the wedge shoulder; the wedge ring having a first surface at a mating inclination to the wedge shoulder and a second surface at a mating inclination to the rim, the wedge ring being movable from a retracted position within the recess, wherein the first and second surfaces are out of engagement with the wedge shoulder and the rim, to the wedging position, the wedge ring being biased toward the wedging position; and a depending lip on the second surface of the split ring that engages a retainer located in the recess to retain the wedge ring in the retracted position until the pin and box stab together, at which time the rim engages the second surface of the wedge ring and pushes the split ring axially to cause the lip to release from the retainer, allowing the wedge ring to move to the wedging position.

8. A connector for connecting two tubular members, comprising:

a pin adapted to be connected to one of the tubular members;

a box adapted to be connected to the other of the tubular members, the box having a bore that receives the pin in stabbing engagement, the bore having a grooved profile;

a split lock ring mounted to the pin, the lock ring snapping into engagement with the grooved profile in the box when the box and pin are stabbed together to lock the tubular members together;

a wedge shoulder on the pin axially spaced apart and facing a rim on the box relative to a longitudinal axis of the connector, the wedge shoulder and rim being inclined relative to each other, resulting in a closer axial distance between them at a first radial portion than at a second radial portion; and a wedge member located between the wedge shoulder and the rim, the wedge member being radially moveable to a wedging position in engagement with the wedge shoulder and the rim to wedge the wedge shoulder and the rim apart from each other.

9. The connector according to claim 8, wherein the wedge member comprises a split wedge ring.

10. The connector according to claim 8, wherein the wedge member comprises a split wedge ring having a first surface that mates with the wedge shoulder and a second surface that mates with the rim, an axial distance between the first and second surfaces being smaller at an outer diameter of the wedge ring than at an inner diameter of the wedge ring.

11. The connector according to claim 8, wherein the wedge member comprises a split wedge ring having a first surface that mates with the wedge shoulder and a second surface that mates with the rim, an axial distance between the first and second surfaces being smaller at an outer diameter of the wedge ring than at an inner diameter of the wedge ring.

12. The connector according to claim 8, wherein the wedge member comprises a split wedge ring carried within a recess on the pin; and wherein the connector further comprises:

a threaded member that engages a threaded hole in the wedge ring and has an inner end that abuts the pin in the recess to push the wedge ring radially outward to the wedging position when the threaded member is rotated.

13. The connector according to claim 8, wherein the wedge member comprises an outwardly biased split wedge ring carried within a recess on the pin; and wherein the connector further comprises:

a depending lip on the second surface of the split ring that engages a retainer located in the recess to retain the wedge ring in the retracted position until the pin and box stab together, at which time the rim engages the second surface of the wedge ring and pushes the split ring axially to cause the lip to release from the retainer, allowing the wedge ring to move to the wedging position.

14. The connector according to claim 8, further comprising:

a threaded release member secured to the box and having an inner end that engages the lock ring to push the lock ring from a locked position to a released position when rotated to allow the pin and box to be pulled apart from each other.

15. A connector for connecting two tubular members, comprising:

a pin adapted to be connected to one of the tubular members;

a box adapted to be connected to the other of the tubular members, the box having a bore that receives the pin in stabbing engagement, the bore having a grooved profile;

a split lock ring mounted to the pin, the lock ring snapping into engagement with the grooved profile in the box when the box and pin are stabbed together to lock the tubular members together;

an annular wedge shoulder on the pin axially spaced apart and facing a rim on the box relative to a longitudinal axis of the connector, the wedge shoulder and rim being inclined relative to each other, resulting in a closer axial distance between them at outer diameters of the pin and box than farther inward;

an annular recess located on the pin at an inner portion of the wedge shoulder, the recess having an inner wall facing outwardly;

a split wedge ring located between the wedge shoulder and the rim, the wedge ring being outwardly moveable from a retracted position in the recess to a wedging position in engagement with the wedge shoulder and the rim to wedge the wedge shoulder and the rim apart from each other; and a threaded member that engages a threaded hole in the wedge ring and has an inner end that abuts the pin in the recess to push the wedge ring radially outward to the wedging position when the threaded member is rotated, a head of the threaded member being accessible from an exterior of the box.

16. The connector according to claim 15, wherein an axial distance from the grooved profile in the bore of the box to the rim is selected so that lock ring will snap into the grooved profile only if the wedge ring is in the retracted position.

17. The connector according to claim 15, further comprising:

a threaded release member secured to the box and having an inner end that engages the lock ring to push the lock ring from a locked position to a released position when rotated to allow the pin and box to be pulled apart from each other.

18. A method for connecting two tubular members, comprising:
(a) providing a connector having a pin on one of the tubular members, a box on the other of the tubular members, the pin and box having annular engagement surfaces, a split lock ring on one of the engagement surfaces and a grooved profile on the other engagement surface, a wedge shoulder on the pins, a reacting surface on the box that is axially spaced from the wedge shoulder relative to a longitudinal axis of the connector, the wedge shoulder and the reacting surface being at different angles relative to the axis, defining a wedge-shaped space between them when viewed in cross-section, and a wedge member that engages the wedge shoulder and the reacting surface and is radially moveable;
(b) stabbing the engagement surfaces of the pin and box together, causing the lock ring to snap into engagement with the grooved profile to lock the pin and box together; then
(c) moving the wedge member radially, thereby sliding the surfaces of the wedge member along the wedge shoulder and the reacting surface to a wedging position wedged between the wedge shoulder and the reacting surface of the box to remove any axial slack between the lock ring and the grooved profile.

19. The method according to claim 18, wherein step (c) is performed by engaging a threaded member with the wedge member and rotating the threaded member to move the wedge member radially.

20. The method according to claim 18, wherein step (c) comprises moving the wedge member radially outward.

* * * * *

UNITED STATES PATENT AND TRADEMARK OFFICE
CERTIFICATE OF CORRECTION

PATENT NO. : 6,682,107 B2
DATED : January 27, 2004
INVENTOR(S) : Brian N. Munk et al.

It is certified that error appears in the above-identified patent and that said Letters Patent is hereby corrected as shown below:

Column 9,
Line 8, delete "pins" and insert -- pin --

Signed and Sealed this

Fourth Day of May, 2004

JON W. DUDAS
*Acting Director of the United States Patent and Trademark Office*